United States Patent
Wang et al.

(10) Patent No.: US 11,912,286 B2
(45) Date of Patent: Feb. 27, 2024

(54) DRIVING RISK IDENTIFICATION MODEL CALIBRATION METHOD AND SYSTEM

(71) Applicant: TSINGHUA UNIVERSITY, Beijing (CN)

(72) Inventors: Jianqiang Wang, Beijing (CN); Heye Huang, Beijing (CN); Xunjia Zheng, Beijing (CN); Keqiang Li, Beijing (CN); Qing Xu, Beijing (CN); Shengbo Li, Beijing (CN); Likun Wang, Beijing (CN); Ziqing Gu, Beijing (CN); Jiawei Wang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 756 days.

(21) Appl. No.: 16/755,892

(22) PCT Filed: May 14, 2018

(86) PCT No.: PCT/CN2018/086641
§ 371 (c)(1),
(2) Date: May 31, 2021

(87) PCT Pub. No.: WO2019/213983
PCT Pub. Date: Nov. 14, 2019

(65) Prior Publication Data
US 2021/0284174 A1 Sep. 16, 2021

(30) Foreign Application Priority Data
May 8, 2018 (CN) .......................... 201810433365.1

(51) Int. Cl.
*B60W 40/09* (2012.01)
*G07C 5/08* (2006.01)
(Continued)

(52) U.S. Cl.
CPC .......... *B60W 40/09* (2013.01); *B60W 50/045* (2013.01); *G07C 5/0808* (2013.01);
(Continued)

(58) Field of Classification Search
CPC ...... B60W 40/09; B60W 50/14; B60W 60/00; G07C 5/08; B60R 16/0231; G01S 13/867
See application file for complete search history.

(56) References Cited

U.S. PATENT DOCUMENTS

| 11,727,495 B1* | 8/2023 | Nepomuceno ....... G05D 1/0214 705/4 |
| 2017/0278319 A1 | 9/2017 | Jung et al. | |

FOREIGN PATENT DOCUMENTS

| CN | 104494599 A | 4/2015 |
| CN | 104648404 A | 5/2015 |

(Continued)

*Primary Examiner* — Tan Q Nguyen
(74) *Attorney, Agent, or Firm* — Bayramoglu Law Offices LLC

(57) ABSTRACT

A method for calibrating a driving risk identification model includes: S1. establishing a vehicle platform by installing an information acquisition device on a test vehicle; S2. acquiring synchronized test data related to the test vehicle and driving scenarios; S3. extracting moments when the drivers start to press the accelerator pedal, start to release the accelerator pedal, start to press the brake pedal in the driving scenarios, and start to release the brake pedal, so as to define risk level values respectively corresponding to the moments; S4. obtaining a risk identification curve of the drivers in different driving scenarios, wherein the risk identification curve represents the drivers' judgment of the risk level over time; S5. using the risk identification curve to calibrate the driving risk identification model.

18 Claims, 2 Drawing Sheets

(51) Int. Cl.
　　　*B60W 50/04*　　　(2006.01)
　　　*B60R 16/023*　　　(2006.01)
　　　*G01S 13/86*　　　(2006.01)
(52) U.S. Cl.
　　　CPC .... *B60R 16/0231* (2013.01); *B60W 2050/041* (2013.01); *B60W 2420/42* (2013.01); *B60W 2420/52* (2013.01); *B60W 2540/10* (2013.01); *B60W 2540/12* (2013.01); *G01S 13/867* (2013.01)

(56) References Cited

FOREIGN PATENT DOCUMENTS

| | | |
|---|---|---|
| CN | 106570560 A | 4/2017 |
| CN | 106952002 A | 7/2017 |

\* cited by examiner

DRIVING RISK IDENTIFICATION MODEL CALIBRATION METHOD AND SYSTEM

CROSS REFERENCE TO THE RELATED APPLICATIONS

This application is the national phase entry of International Application No. PCT/CN2018/086641, filed on May 14, 2018, which is based upon and claims priority to Chinese Patent Application No. 201810433365.1, filed on May 8, 2018, the entire contents of which are incorporated herein by reference.

TECHNICAL FIELD

The present invention relates to the technical field of smart vehicles, and in particular to method and system for calibrating a driving risk identification model.

BACKGROUND

With the rapid development of intelligent transportation, intelligent driving technology and internet of vehicles (connected vehicles, or Cooperative Intelligent Transport System), automobile intelligence has gradually become familiar and accepted, and the replacement of traditional vehicles with smart vehicles is bound to become the trend of the times. However, the current development of technology of smart vehicles can no longer meet the needs of the commercialization of smart vehicles. The large-scale commercialization of smart vehicles, faces higher requirements on driving safety.

In the prior art, a system provided with a driving risk identification model (hereinafter, "the system provided with a driving risk identification model is simply referred to as a "driving risk identification system") is generally adopted to provide dangerous warning information to drivers and to the control system of the vehicles, so as to ensure the safety of smart vehicles or cars. The driving risk identification model is not only the core control logic of the driving risk identification system, but also determines the safety performance and acceptance of the driving risk identification system. Because during the actual driving process, the physiological and psychological states of the drivers changes with time and space, and there are individual differences among the drivers, this requires the parameter(s) of the driving risk identification model to be variability and adaptability. Therefore, there would be frequent disturbances and conflicts between the driving risk identification system and the driver's normal driving, which in turn reduces the acceptance of the driving risk identification system, and it is difficult to ensure the driving safety of the vehicles in complicated and varied traffic environments.

SUMMARY

It is an object of the present invention to provide a method for calibrating a driving risk identification model that overcomes or at least mitigates at least one of the above-discussed deficiencies of the prior art.

Therefore, the present invention provides a method for calibrating a driving risk identification model, wherein the method for calibrating a driving risk identification model, comprising:

S1. establishing a vehicle platform by installing an information acquisition device on a test vehicle;

S2. performing freely driving tests; and acquiring synchronized test data related to the test vehicle and driving scenarios, in the freely driving tests, drivers drive the vehicle platform in multiple driving scenarios;

S3. according to the test data, extracting first moments when the drivers start to press the accelerator pedal in the driving scenarios, second moments when the drivers start to release the accelerator pedal in the driving scenarios, third moments when the drivers start to press the brake pedal in the driving scenarios, and fourth moments when the drivers start to release the brake pedal in the driving scenarios, so as to define risk level values respectively corresponding to the first moments, the second moments, the third moments, and the fourth moments;

S4. according to the defined risk level values, obtaining a risk identification curve of the drivers in different driving scenarios through curve fitting, wherein the risk identification curve represents the drivers' judgment of the risk level over time;

S5. using the risk identification curve to calibrate the driving risk identification model.

Further, S5 specifically comprises:

S51. according to the test data, calculating identification risk values corresponding to the first moments, the second moments, the third moments, and the fourth moments by using the driving risk identification model, where the identification risk values include one or more parameters to be calibrated;

S52. adjusting the parameters to be calibrated, so that the curve of the identified risk value obtained by the driving risk identification model is close to the risk identification curve.

Further, the "test data" used in S5 comprises CAN data of the vehicle, the "driving risk identification model" in S51 is expressed as:

$$U[x(t)] = U_{att}[x(t)] + U_{rep}[x(t)],$$

where, $U[x(t)]$ is the identified risk value calculated by using the driving risk identification model;

$U_{att}[x(t)]$ is a goal attraction model, and it is expressed as:

$$U_{att}[x(t)] = \frac{1}{2}\varepsilon(x_{goal}(t) - [x(t)])^2;$$

$U_{rep}[x(t)]$ is an obstacle repulsive force model, and it is expressed as:

$$U_{rep}[x(t)] = \begin{cases} \frac{1}{2}\tau\left(\frac{1}{x_{obs}(t) - x(t)} - \frac{1}{x_0}\right)^2, & \text{if } x_{obs}(t) - x(t) \leq x_0 \\ 0, & \text{if } x_{obs}(t) - x(t) > x_0 \end{cases};$$

$\varepsilon$ represents the scale factor of the attraction, which is one of the parameters to be calibrated;

$\tau$ represents the scale factor of the repulsive force, which is one of the parameter to be calibrated;

$x_{goal}$ is the coordinate of the goal;

x is the coordinate of the vehicle;

$x_{obs}$ is the coordinate of the obstacle;

$x_0$ is the influence radius of the obstacle.

Further, there are n parameters to be determined in S51; S52 specifically includes:

S521. presetting values of (n−1) of the parameters to be calibrated, according to experience;

S522. changing the value of the remaining nth parameter to be calibrated, and comparing the identified risk values with the risk level values on the risk identification curve corresponding to same moments, when the sum of squares of the differences between the two values is minimal, the value of the nth parameter to be calibrated is determined.

Further, the "test data" used in S3 includes accelerator pedal angle signals and the brake pedal angle signals of the vehicle collected by the information acquisition device;

S3 specifically includes:

S31. extracting the distribution of $t_{i,acc,s}$, $t_{i,acc,e}$, $t_{i,bra,s}$ and $t_{i,bra,e}$ of a driver $d_i$ according to the accelerator pedal angle signals and the brake pedal angle signals of the vehicle;

S32. according to the distribution of the first moment $t_{i,acc,s}$, the second moment $t_{i,acc,e}$, the third moment $t_{i,bra,s}$ and the fourth moment $t_{i,bra,e}$ obtained in S31, combined with $t_{i,acc,s}$, $t_{i,acc,e}$, $t_{i,bra,s}$ and $t_{i,bra,e}$ corresponding to the environment $s_j$ at each moment, using the clustering algorithm, obtaining the cluster centers $L_{ij,acc,s}$, $L_{ij,acc,e}$, $L_{ij,bra,s}$, $L_{ij,bra,e}$ of the scatter points on $t_{i,acc,s}$, $t_{i,acc,e}$, $t_{i,bra,s}$ and $t_{i,bra,e}$, $L_{ij,acc,s}$ represents the risk level of the first moment, $L_{ij,acc,e}$ represents the risk level of the second moment, $L_{ij,bra,s}$ represents the risk level of the third moment, and $L_{ij,bra,e}$ represents the level of risk of the fourth moment;

S33. defining a maximum risk level value $L_{max}$, and $L_{max}$ corresponds to TTC=0;

S34. assigning values to $L_{ij,acc,s}$, $L_{ij,acc,e}$, $L_{ij,bra,s}$, $L_{ij,bra,e}$ in the range of [0, Lmax];

where i is the serial number of one of the drivers, i=1 to n;

j is the serial number of one of scenarios, j=1 to m.

Further, S1 specifically comprises:

mounting a radar and a vision sensor for obtaining target position information and motion information on the test vehicle, mounting an angle sensor for obtaining accelerator pedal angle signals on the test vehicle, mounting an angle sensor for obtaining brake pedal angle signals on the test vehicle;

S2 specifically comprises:

fusing the data collected by each of the radar and the visual sensor, to obtain accurate target position information, motion information, including coordinates, speeds, and accelerations.

Further, the first moment $t_{i,acc,s}$ represents a moment when the accelerator pedal angle signal is 0, and at its next moment the accelerator pedal angle signal is greater than 0;

the second moment $t_{i,acc,e}$ represents a moment when the accelerator pedal angle signal is 0, and at its previous moment the accelerator pedal angle signal is greater than 0;

the third moment $t_{i,bra,s}$ represents a moment when the brake pedal angle signal is 0, and at its next moment the brake pedal angle signal is greater than 0;

the fourth moment $t_{i,bra,e}$ represents a moment when the brake pedal angle signal is 0, and at its previous moment the brake pedal angle signal is greater than 0.

The invention also provides a system for calibrating a driving risk identification model comprising:

an information acquisition device mounted on a test vehicle to form a vehicle platform, for collecting synchronized test data related to the vehicle and driving scenarios, wherein the test data related to the vehicle include goal position information and motion information, accelerator pedal angle signals and brake pedal angle signals; the test data related to driving scenarios include environmental types, traffic participants, traffic signs, and road signs;

a moment extraction device, for extracting, according to the test data, first moments when drivers start to press the accelerator pedal in the driving scenarios, second moments when the drivers start to release the accelerator pedal in the driving scenarios, third moments when the drivers start to press the brake pedal in the driving scenarios, and fourth moments when the drivers start to release the brake pedal in the driving scenarios;

a risk level definition device, for defining risk level values respectively corresponding to the first moments, the second moments, the third moments, and the fourth moments;

a risk identification curve obtaining device, for obtaining a risk identification curve of the drivers in different scenarios according to the defined risk level values, and the risk identification curve represents the drivers' judgment of the risk level over time; and a calibration device, for calibrating the driving risk identification model by using the risk identification curve.

Further, the calibration device comprises:

a driving risk identification calculation unit, for calculating identification risk values corresponding to the first moments, the second moments, the third moments, and the fourth moments by using the driving risk identification model, wherein the identification risk values include one or more parameters to be calibrated; and a parameter calibration unit, for adjusting the parameters to be calibrated, so that the curve of the identified risk value obtained by the driving risk identification model is close to the risk identification curve.

The present invention also provides an intelligent vehicle comprising a system for calibrating a driving risk identification model, wherein the system is preset in the ECU.

In the present invention, by recording the operation of the driver on the vehicle platform, the risk identification curve for the driver to judge the risk level in different scenarios is identified. The risk identification curve is used for calibrating the driving risk identification model, so the calibrated driving risk identification model can adapt to the driving habits of different drivers. This is conducive to improving the acceptance of the driving risk identification system. It should be noted that in addition to the driving risk identification model, the traditional method of actively controlling the vehicle by TTC (Time to Collision) or THW (Time Headway) can also be called driving risk. The parameter calibration of this kind of model can still be calibrated by using the risk identification curve provided by this embodiment.

DETAILED DESCRIPTION

Figure 1A:
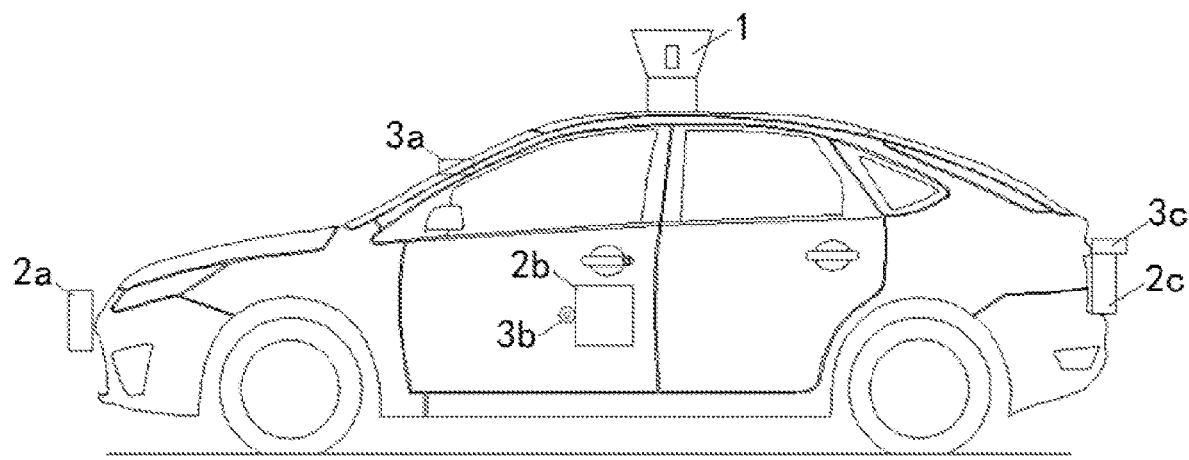
FIG. 1A is a side view of the vehicle platform of the present invention.

In the drawings, the same or similar reference numerals are used to indicate the same or similar elements or elements having the same or similar functions. The embodiments of the present invention will be described in detail below with reference to the drawings.

In the description of the present invention, the terms "center", "longitudinal", "transverse", "front", "back", "left", "right", "vertical", "horizontal", "top", "inside", "bottom", "outside" and the like and so on, indicate the orientation or positional relationship of the indications " " " ", based on the orientation or positional relationship shown in the drawings. It is merely for convenience of description of the present invention, and does not indicate or imply that the indicated device or component must be constructed and operated in a particular orientation, and is not to be construed as limiting the scope of the invention.

One embodiment of the present invention provides a method for calibrating a driving risk identification model, and the method comprises the following steps:

S1, establishing a vehicle platform by installing an information acquisition device on a test vehicle;

S2, driving the vehicle platform in multiple driving scenarios by drivers to perform freely driving tests; and acquiring synchronized test data related to the vehicle and the driving scenarios;

S3. according to the test data, extracting first moments when the drivers start to press the accelerator pedal in the driving scenarios, second moments when the drivers start to release the accelerator pedal in the driving scenarios, third moments when the drivers start to press the brake pedal in the driving scenarios, and fourth moments when the drivers start to release the brake pedal in the driving scenarios, so as to define risk level values respectively corresponding to the first moments, the second moments, the third moments, and the fourth moments;

S4, according to the defined risk level values, a risk identification curve of the drivers in different scenarios is obtained through curve fitting, and the risk identification curve represents the drivers' judgment of the risk level over time;

S5, using the risk identification curve to calibrate the driving risk identification model.

In this embodiment, by recording the driver's operation on the vehicle platform and related information, a risk identification curve is identified, and the risk identification curve represents the drivers' judgment of the risk level in different scenarios or environments. The risk identification curve is then used to calibrate the driving risk identification model. Therefore, the calibrated driving risk identification model can adapt to the driving habits of different drivers, and is conducive to improving the acceptance of the driving risk identification system. It should be noted that, in addition to the driving risk identification model, the traditional method of actively controlling the vehicle by means of TTC or THW can also be called a driving risk identification model. The parameter calibration of the model can be performed by utilizing the risk identification curve provided by the embodiment.

In some embodiments, S1 specifically comprises the following steps:

mounting one or more radars and one or more vision sensors for obtaining target position information and motion information on the test vehicle, mounting one or more angle sensors for obtaining accelerator pedal angle signals, at the accelerator pedal shaft of the test vehicle, mounting one or more angle sensors for obtaining brake pedal angle signals, at the ac brake pedal shaft of the test vehicle.

Figure 1B:
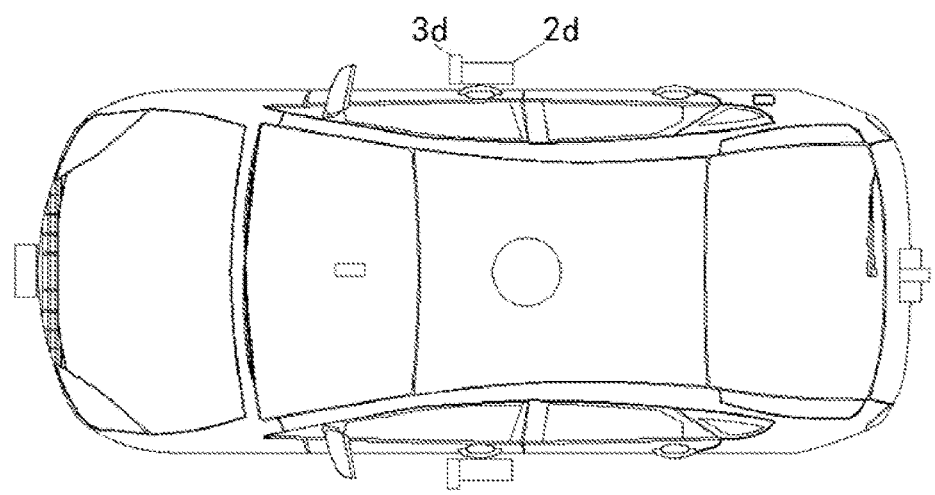
FIG. 1B is a top plan view of the vehicle platform of FIG. 1A.

As shown in FIG. 1A and FIG. 1B, S1 specifically includes the following steps.

S11, mounting a 64-line laser radar 1 on the top of the test vehicle, for obtaining sensor raw data regarding the vertical and horizontal coordinate positions and type(s) of the target(s).

S12, mounting a first millimeter wave radar 2a, a second millimeter wave radar 2b, a third millimeter wave radar 2c, a fourth millimeter wave radar 2d, and a first visual sensor 3a, a second visual sensor 3b, a third visual sensor 3c, and a fourth visual sensor 3d respectively in the front, rear, left, and right directions of the test vehicle, so as to acquire the velocities, accelerations, and vertical and horizontal coordinate positions of the target(s).

S13, calibrating the positions of the 64-line laser radar 1, the millimeter wave radars and visual sensors on the test vehicle. The calibration method can be implemented using existing calibration methods.

Figure 2:
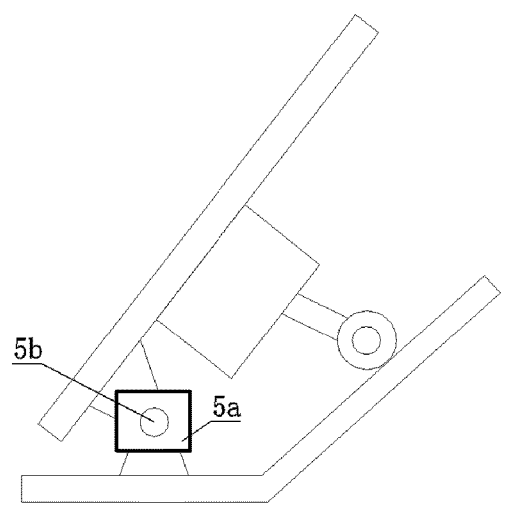
FIG. 2 is a schematic view showing a first angle sensor mounted at the accelerator pedal.

S14, mounting a first angle sensor 5a on the accelerator pedal shaft 5b, as shown in FIG. 2. The accelerator pedal angle signal is acquired by the first angle sensor 5a, and the accelerator pedal angle signal can be used to obtain the first moments $t_{i,acc,s}$ when the accelerator pedal is started to be pressed and the second moments $t_{i,acc,e}$ when the accelerator pedal is started to be released. For example, a moment, when the accelerator pedal angle signal is 0 (initial position), but the accelerator pedal angle signal recorded at its next moment is greater than 0, is regarded as the first moment $t_{i,acc,s}$. For example, a moment, when the accelerator pedal angle signal is 0 (initial position), but the accelerator pedal angle signal recorded at its previous moment is greater than 0, is regarded as the second moment $t_{i,acc,e}$.

Figure 3:
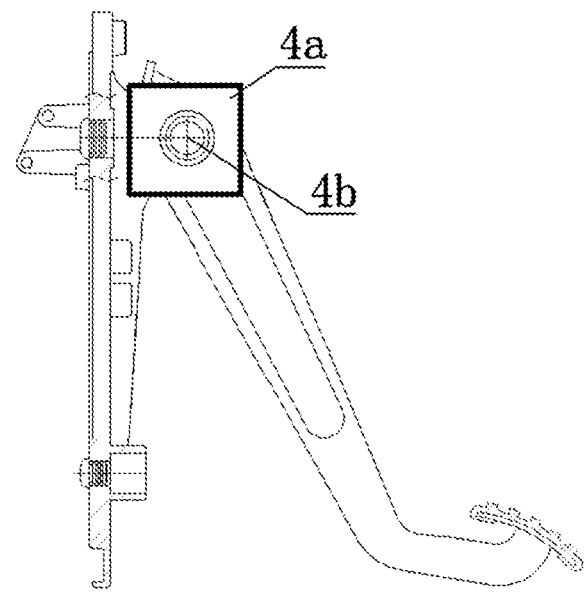
FIG. 3 is a schematic view showing a second angle sensor mounted at the brake pedal.

A second angle sensor 4a is mounted to the brake pedal shaft 4b, shown in FIG. 3. The second angle sensor 4a acquires brake pedal angle signals, and the brake pedal angle signals can be used to obtain the third moments $t_{i,bra,s}$ and the fourth moments $t_{i,bra,e}$. For example, a moment, when the brake pedal angle signal is 0, but the brake pedal angle signal recorded at its next moment is greater than 0, is regarded as the third moment $t_{i,bra,s}$. For example, a moment, when the brake pedal angle signal is 0, but the brake pedal angle signal recorded at its previous moment is greater than 0, is regarded as the fourth moment $t_{i,bra,e}$.

It should be noted that the data acquired or collected by each sensor in step S1 are in the form of raw data, and the raw data needs to be parsed into the target data in the subsequent step(s). The raw data includes pictures and videos captured by the camera; point clouds scanned by the laser radar; millimeter wave signals received by the millimeter wave radars. The target data includes the speed and position data of the targets such as pedestrian(s), rider(s), and vehicle(s), and are obtained after fusion of the raw data from the above three kinds of sensors. The method of "fusion of the raw data" is as follows:

The laser radar uses feature extraction and point cloud clustering to detect targets, and obtains accurate target position information. The visual sensors perform machine learning-based target detection on road targets, so as to provide target category information for the target detection of the laser radar. Millimeter wave radars identify dynamics targets and provide accurate target speed and position information. Through a data association method, the information regarding same target detected by each sensor are matched. Finally, for each target, accurate target position information, motion information, i.e., coordinates, speeds, and accelerations are obtained.

Therefore, the embodiment adopts a multi-sensor sensing system composed of a 64-line laser radar, millimeter wave radars, and visual sensors to construct a vehicle platform, which can identify position information and state information of moving objects (targets) and stationary objects (targets) surrounding the test vehicle.

In some embodiments, the selection principle of "driver" in S2 includes the following.
1) Selecting a certain number of drivers who have long-term driving experience and have not experienced serious traffic accidents.
2) The number of "drivers" is as large as possible, so that by collecting as many sets of test data as possible, and considering the driving habits of more drivers, so that the risk identification curves obtained in the subsequent steps S3 and S4 are more extensive and representative. It is conducive to improving the drivers' acceptance of the driving risk identification.

The "vehicle and environment-related test data" in S2 includes the test data of the self-vehicle (test vehicle) and the test data of the environment.

The test data of the self-vehicle includes: 1) time-synchronized or time-related object position information and motion information acquired by the radars and the visual sensors, 2) time-synchronized accelerator pedal angle signals obtained by the first angle sensor, 3) time-synchronized brake pedal angle signals obtained by the second angle sensor, and 4) self-vehicle CAN data. The self-vehicle CAN data includes: engine speed, steering wheel angle, vehicle speed, gear position, acceleration, and deceleration. The data collected by each of the radars and the visual sensors are fused to obtain accurate object position information, motion information, i.e., coordinates and speeds, and accelerations of objects.

The "multiple driving scenarios (or different driving scenarios)" in S2 include the following contents.
The types of driving scenarios: the first level types of driving scenarios including: campus, park, city, and highway; the second level types of driving scenarios including: uphill, downhill, on the bridge, under the bridge, tunnel, straight road, and curved road.
Traffic participants: the first level types of traffic participants including: motor vehicles, non-motor vehicles, and fixed objects. With respect to the second level types of traffic participants, the motor vehicles further include: cars, buses, minivans, trucks, medium passenger cars, motorcycles, and other motor vehicles; the non-motor vehicles include: pedestrians, cyclists, two-wheelers, and other non-motor vehicles; fixed objects include: cones, fences, etc.
Traffic signs, including the first level types of traffic signs. The first level types of traffic signs include traffic signs boards, traffic lights, lane lines. With respect to the second level types of traffic signs, the traffic signs boards include: speed limit sign, height limit sign, weight limit sign, instruction sign, warning sign, prohibition sign, and other signs; the traffic lights include the following patterns: round pattern, arrow pattern, pedestrian pattern, two-wheeler pattern.
Road signs: the first level types of road signs include lane lines and road markings. The lane lines further include: single solid lines, double solid lines and dotted lines; the pavement markings further includes: straight arrow, right turn arrow, left turn arrow and other road markings.
Weather conditions: sunny, overcast, rain, snow.

That is, the test data of the driving scenarios corresponds to or includes various values of information listed in the above "driving scenarios".

The time-synchronized "self-vehicle and environment-related test data" in S2 is stored by means of a database.

In some embodiments, the "test data" in S3 includes accelerator pedal angle signals and brake pedal angle signals of the self-vehicle (test vehicle).

For example, S3 specifically includes S31, S32, S33 and S34.

S31, extracting the distribution of the moments $t_{i,acc,s}$, $t_{i,acc,e}$, $t_{i,bra,s}$ and $t_{i,bra,e}$ of each driver $d_i$, according to the accelerator pedal angle signals and the brake pedal angle signals of the vehicle.

The first thing to note is that the four moments $t_{i,acc,s}$, $t_{i,acc,e}$, $t_{i,bra,s}$ and $t_{i,bra,e}$ of the driver $d_i$ are on one time axis. Method for extracting the distribution of $t_{i,acc,s}$, $t_{i,acc,e}$, $t_{i,bra,s}$ and $t_{i,bra,e}$ of the driver $d_i$," includes: marking the four moments $t_{i,acc,s}$, $t_{i,acc,e}$, $t_{i,bra,s}$ and $t_{i,bra,e}$ of the driver $d_i$ with different colors respectively, and finally clustering values of different colors so as to yield a value. For example, in a certain scenario, for a driver or n drivers, m sets of data are collected, and 4*m or 4*m*n data points are obtained. The 4 points (moments) needed for this step S3 are obtained through clustering the four sets of data points.

S32, according to the distribution of the first moment $t_{i,acc,s}$, the second moment $t_{i,acc,e}$, the third moment $t_{i,bra,s}$ and the fourth moment $t_{i,bra,e}$ obtained in S31, combined with $t_{i,acc,s}$, $t_{i,acc,e}$, $t_{i,bra,s}$ and $t_{i,bra,e}$ corresponding to the environment $s_j$ at each moment, using the clustering algorithm, obtaining the cluster centers $L_{ij,acc,s}$, $L_{ij,acc,e}$, $L_{ij,bra,s}$, $L_{ij,bra,e}$ of the scatter points on $t_{i,acc,s}$, $t_{i,acc,e}$, $t_{i,bra,s}$ and $t_{i,bra,e}$, $L_{ij,acc,s}$ represents the risk level of the first moment, $L_{ij,acc,e}$ represents the risk level of the second moment, $L_{ij,bra,s}$ represents the risk level of the third moment, and $L_{ij,bra,e}$ represents the level of risk of the fourth moment;

S33, defining a maximum risk level value $L_{max}$, and $L_{max}$ corresponds to TTC=0;

S34, assigning values to $L_{ij,acc,s}$, $L_{ij,acc,e}$, $L_{ij,bra,s}$, $L_{ij,bra,e}$ in the range of [0, Lmax];

where i is the serial number of one of the drivers, i=1 to n;

j is the serial number of one of driving scenarios, j=1 to m.

In some embodiments, the "curve fit" in S4 can be a simple linear data fit, a cubic spline curve fit, a cubic Bezier curve fit, and the like. In one embodiment, the "curve fitting" used by S4 is a least squares fitting method. The least square method is a common method for curve fitting in the early stage. The least squares method is simple in theory and relates to a limited calculation amount. Although cubic spline curves are used for curve fitting, the least squares method is still widely used in the curve fitting regarding polynomial curves or straight lines.

Figure 4:
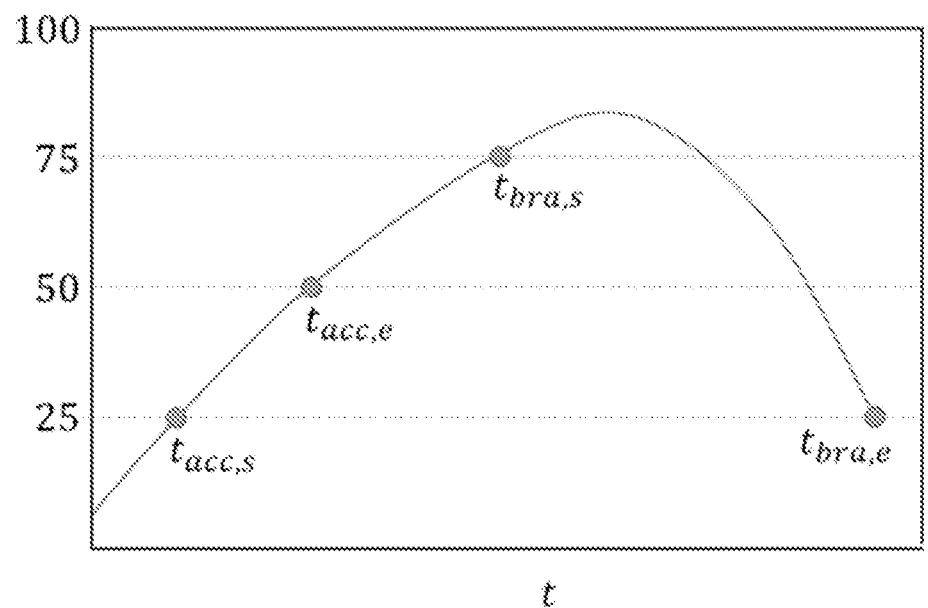
FIG. 4 is a schematic diagram of a driving risk identification curve of a driver obtained by the method of the present invention.

The "risk identification curve" in S4 represents the change of the risk level of the driver $d_i$ in the environment $s_j$ with time, as shown in FIG. 4. In FIG. 4, the horizontal axis of the risk identification curve represents time, and the vertical axis represents risk level. FIG. 4 can represent a driver's risk identification curve in different environments, and can also represent a driver's risk identification curve in an environment, and can also represent the risk identification curve of multiple drivers in an environment. This depends on the fitted data.

In some embodiments, S5 specifically comprises:
S51. according to the test data, calculating potential energies or field forces identification risk values corresponding to the first moments, the second moments, the third moments, and the fourth moments by using the driving risk identification model, where the potential energies or the field forces include one or more parameters to be calibrated;
S52. adjusting the parameters to be calibrated, so that the curve of the identified risk value obtained by the driving risk identification model is close to the risk identification curve. The term "is close to" in this step can be understood as the commonly used mathematical symbol "→". That is to say, at same moment, the identified risk value obtained by the driving risk identification model is infinitely approached to the risk identification curve.

In this way, the driving risk identification model is calibrated according to the risk identification curve, and the driving habits and requirements of drivers are met while ensuring the safety of the smart vehicles.

In some embodiments, the type of the driving risk identification model is generally selected according to the research requirements. For example, if a lane keeping assist system is designed, the potential energy field formed by the position of the lane line can be directly used to keep the vehicle running in the center of the lane. Therefore, in this system, only the information of the lane line is needed, and the corresponding artificial potential field model is also a model considering only the lane line.

The "test data" in S51 includes CAN data of the vehicle and environmental test data. For different driving risk identification models, according to the risk identification curve in each environment, for any driving risk identification model, the greater the risk value of the potential energy field is caused by the road traffic environment to the test vehicle, the greater the risk is. In other words, a greater risk value of the potential energy field caused by the road traffic environment, indicates a greater risk. The more complicated the driving risk identification model is, the more experimental data is required, and the more the parameters to be calibrated are required. Therefore, S2 requires a large amount of test data to be stored in the database, in order to meet the data requirements of more driving risk identification models. There is also a driving risk identification model that does not require the use of environmental test data, as shown in the following risk identification model:

$$U[x(t)] = U_{att}[x(t)] + U_{rep}[x(t)];$$

In the formula,
U[x(t)] is the identified risk value calculated by using the driving risk identification model;
$U_{att}[x(t)]$ is the attractive model of the target, and its expression is $$U_{att}[x(t)] = \frac{1}{2}\varepsilon(x_{goal}(t) - [x(t)])^2;$$

$U_{rep}[x(t)]$ is the repulsive force model of the obstacle, and its expression is $$U_{rep}[x(t)] = \begin{cases} \frac{1}{2}\tau\left(\frac{1}{x_{obs}(t) - x(t)} - \frac{1}{x_0}\right)^2, & \text{if } x_{obs}(t) - x(t) \leq x_0 \\ 0, & \text{if } x_{obs}(t) - x(t) > x_0 \end{cases};$$

ε represents the scale factor of the attraction, which is a parameter to be calibrated;
τ represents a scale factor of the repulsive force, which is a parameter to be calibrated;
$x_{goal}$ is the coordinates of the goal. The term "goal" here refers to the destination that the vehicle is expected to arrive at, and its value is preset. For example, if the position at 30 meters in front of the test vehicle is preset as the destination, then for the driving risk identification model, the destination always goes ahead with the vehicle, always 30 meters in front of the vehicle;
x is the coordinate of the vehicle;
$x_{obs}$ is the coordinate of the obstacle, and the "obstacle" here is the traffic participant listed in S2;
$x_0$ is the radius of influence of the obstacle.

It should be noted that the "coordinates" in the above model means the position information that can be understood as the position of the obstacle relative to the vehicle.

In the prior art, the method for calibrating parameters of the driving risk identification model specifically utilizes both the position information and the speed information of the obstacle. In this embodiment, only the position information of the obstacle is utilized. Because the driving risk identification in this embodiment only considers the position information; the calibrated driving risk identification model can be used for the unmanned path planning and for intelligent decision-making of the advanced driving assistance system ADAS. For example, AEB system can perform emergency braking by means of the calibrated driving risk identification model, LKW can perform lane departure warning by means of an identified lane line position, FCW can make forward collision warning by means of an identified obstacle position, and so on.

For example, the expression of "calculating potential energies or field forces corresponding to the first moments, the second moments, the third moments, and the fourth moments by using the driving risk identification model," in S51 specifically refers to: the first moment $t_{ij,acc,s}$ the second moment $t_{ij,acc,e}$, the third moment $t_{ij,bra,s}$ and the fourth moment $t_{ij,bra,e}$, determined by S3, are substituted into the driving risk identification model $U = U[X(t), \eta_1, \eta_2, \ldots, \eta_k]$, where η represents the parameters to be calibrated.

In some embodiments, there are n parameters to be calibrated.

S52 specifically includes:
S521, presetting values of (n−1) of the parameters to be calibrated, according to experience;
S522: gradually changing the value of the remaining nth parameter to be calibrated, and comparing the identified risk values with the risk level values on the risk identification curve corresponding to same moments, when the sum of squares of the differences between the two values is minimal, the value of the nth parameter to be calibrated is determined.

That is, the value of the nth parameter to be calibrated determined by S22 corresponds to the difference (A−B)

between the identified risk value A at the same time and the risk level value B on the risk identification curve. The sum of squares is the smallest.

The method of "comparing the difference between the identified risk value and the risk level value on the risk identification curve at the same time" in S522 is:

Using a least squares method, comparing the difference between the identified risk value and the risk level value on the risk identification curve at the same time, and determining the n parameters to be calibrated when the sum of the squares of the differences is minimum value. The value of the parameter to be calibrated can be easily obtained by the least squares method, and the sum of squared errors between the value of the parameter to be calibrated and the actual data is minimized. Of course, polynomial interpolation, exponential function fitting, power function fitting, hyperbolic fitting, etc. can also be used instead of the least squares method.

The invention also provides a calibration system for a driving risk identification model, wherein the calibration system of the driving risk identification model comprises: an information acquisition device, a time extracting device, a risk level defining device, a risk identification curve acquiring device and a calibration device, wherein:

The information acquisition device is disposed on the test vehicle to form a vehicle platform for collecting self-vehicle and environment-related test data synchronized with time, the self-vehicle test data including target position information and motion information, and an accelerator pedal angle signal. And brake pedal angle signals; the environmental test data includes environmental types, traffic participants, traffic signs, and road signs.

The time extraction device is configured to extract, according to the test data, first moments when different drivers start to step on the accelerator pedal, second moments when the accelerator pedal is started to be released, third moments when the brake pedal is started to be depressed, and the fourth moments when the brake pedal is started to be released, in multiple driving scenarios.

The risk level definition device is configured to define risk level values corresponding to the first moment, the second moment, the third moment, and the fourth moment respectively.

The risk identification curve obtaining device obtains a risk identification curve of the driver in different scenarios according to the defined risk level values, and the risk identification curve indicates the driver's judgment on the risk level over time.

The calibration device uses the risk identification curve to calibrate the driving risk identification model.

In this embodiment, by recording the driver's operation on the vehicle platform, the risk identification curve of the driver's risk level in different scenarios is identified, and the risk identification curve is used to calibrate the driving risk identification model, so the calibrated driving risk identification is performed. The model can adapt to the driving habits of different drivers and is conducive to improving the acceptance of the driving risk identification system. It should be noted that, in addition to the driving risk identification model, the traditional method of actively controlling the vehicle by means of TTC or THW can also be called a driving risk identification model. The parameter calibration of the model can still be calibrated by using the risk identification curve provided in the embodiment.

In some embodiments, the calibration device specifically includes: a driving risk identification calculation unit and a parameter calibration unit.

The driving risk identification calculation unit calculates the identified risk value corresponding to the first moment, the second moment, the third moment, and the fourth moment by using the driving risk identification model according to the test data, where the identified risk value includes a to-be-calibrated parameter.

The parameter calibration unit adjusts the parameter to be calibrated so that the curve of the identified risk value obtained by the driving risk identification model changes infinitely to the risk identification curve.

The present invention also provides an intelligent vehicle comprising a calibration system for a driving risk identification model as described in the above embodiments, wherein the calibration system of the driving risk identification model is preset in an ECU (Electronic Control Unit).

Finally, it should be noted that the above embodiments are only used to illustrate the technical solutions of the present invention, and are not limited thereto. It should be understood by those skilled in the art that the technical solutions described in the foregoing embodiments may be modified, or some of the technical features may be equivalently substituted; the modifications or substitutions do not deviate from the spirit and scope of the technical solutions of the embodiments.

What is claimed is:
1. A method for calibrating a driving risk identification model, comprising:
S1, establishing a vehicle platform by installing an information acquisition device on a test vehicle;
S2, performing freely driving tests; and acquiring synchronized test data related to the test vehicle and a plurality of driving scenarios, wherein in the freely driving tests, drivers drive the vehicle platform in the plurality of driving scenarios;
S3, according to the synchronized test data, extracting first moments when the drivers start to press an accelerator pedal in the plurality of driving scenarios, second moments when the drivers start to release the accelerator pedal in the plurality of driving scenarios, third moments when the drivers start to press a brake pedal in the plurality of driving scenarios, and fourth moments when the drivers start to release the brake pedal in the plurality of driving scenarios to define risk level values respectively corresponding to the first moments, the second moments, the third moments, and the fourth moments;
S4, according to the risk level values, obtaining a risk identification curve of the drivers in the plurality of driving scenarios through curve fitting, wherein the risk identification curve represents a judgment of a risk level over time of the drivers; and
S5, using the risk identification curve to calibrate the driving risk identification model.
2. The method according to claim 1, wherein
S5 specifically comprises:
S51, according to the synchronized test data, calculating identification risk values corresponding to the first moments, the second moments, the third moments, and the fourth moments by using the driving risk identification model, wherein the identification risk values comprise at least one parameter to be calibrated; and
S52, adjusting the at least one parameter to be calibrated, wherein a curve of the identification risk values obtained by the driving risk identification model is close to the risk identification curve.

3. The method according to claim 2, wherein
the "synchronized test data" used in S5 comprises controller area network (CAN) data of the test vehicle,
the "driving risk identification model" in S51 is expressed as:

$$U[x(t)]=U_{att}[x(t)]+U_{rep}[x(t)],$$

wherein,

U[x(t)] is the identification risk values calculated by using the driving risk identification model;

$U_{att}[x(t)]$ is a goal attraction model expressed as:

$$U_{att}[x(t)] = \frac{1}{2}\varepsilon(x_{goal}(t) - [x(t)])^2;$$

$U_{rep}[x(t)]$ is an obstacle repulsive force model expressed as:

$$U_{rep}[x(t)] = \begin{cases} \frac{1}{2}\tau\left(\frac{1}{x_{obs}(t) - x(t)} - \frac{1}{x_0}\right)^2, & \text{if } x_{obs}(t) - x(t) \leq x_0 \\ 0, & \text{if } x_{obs}(t) - x(t) > x_0 \end{cases};$$

wherein

ε represents a scale factor of an attraction, and ε is one of the at least one parameter to be calibrated;

τ represents a scale factor of a repulsive force, and τ is one of the at least one parameter to be calibrated;

$x_{goal}$ is a coordinate of a goal;

x is a coordinate of the test vehicle;

$x_{obs}$ is a coordinate of an obstacle;

$x_0$ is an influence radius of the obstacle.

4. The method according to claim 3, wherein
the "synchronized test data" used in S3 comprises accelerator pedal angle signals and brake pedal angle signals of the test vehicle, wherein the accelerator pedal angle signals and the brake pedal angle signals of the test vehicle are collected by the information acquisition device;

S3 specifically comprises:

S31, extracting a distribution of a first moment $t_{i,acc,s}$, a second moment $t_{i,acc,e}$, a third moment $t_{i,bra,s}$ and a fourth moment $t_{i,bra,e}$ of a driver $d_i$ according to the accelerator pedal angle signals and the brake pedal angle signals of the test vehicle;

S32, according to the distribution of the first moment $t_{i,acc,s}$, the second moment $t_{i,acc,e}$, the third moment $t_{i,bra,s}$ and the fourth moment $t_{i,bra,e}$ obtained in S31, combined with $t_{i,acc,s}$, $t_{i,acc,e}$, $t_{i,bra,s}$ and $t_{i,bra,e}$ corresponding to an environment $s_j$ at each of the first moment $t_{i,acc,s}$, the second moment $t_{i,acc,e}$, the third moment $t_{i,bra,s}$ and the fourth moment $t_{i,bra,e}$, using a clustering algorithm, obtaining cluster centers $L_{ij,acc,s}$, $L_{ij,acc,e}$, $L_{ij,bra,s}$, $L_{ij,bra,e}$ of scatter points on $t_{i,acc,s}$, $t_{i,acc,e}$, $t_{i,bra,s}$ and $t_{i,bra,e}$, wherein $L_{ij,acc,s}$ represents a risk level of the first moment $t_{i,acc,s}$, $L_{ij,acc,e}$ represents a risk level of the second moment $t_{i,acc,e}$, $L_{ij,bra,s}$ represents a risk level of the third moment $t_{i,bra,s}$, and $L_{ij,bra,e}$ represents a risk level of the fourth moment $t_{i,bra,e}$;

S33, defining a maximum risk level value $L_{max}$, wherein $L_{max}$ corresponds to TTC=0;

S34, assigning values to $L_{ij,acc,s}$, $L_{ij,acc,e}$, $L_{ij,bra,s}$, $L_{ij,bra,e}$ in a range of [0, Lmax];

wherein i is a serial number of one of the drivers, and i=1 to n;

j is a serial number of one of the plurality of driving scenarios, and j=1 to m.

5. The method according to claim 3,
wherein S1 specifically comprises:

mounting a radar and a vision sensor for obtaining target position information and motion information on the test vehicle, mounting a first angle sensor for obtaining accelerator pedal angle signals on the test vehicle, mounting a second angle sensor for obtaining brake pedal angle signals on the test vehicle;

S2 specifically comprises:

fusing data collected by each of the radar and the visual sensor, to obtain the target position information and the motion information, wherein the target position information and the motion information comprise coordinates, speeds, and accelerations.

6. The method according to claim 5,
wherein the first moment $t_{i,acc,s}$ represents a first moment when the accelerator pedal angle signals are 0, and at a moment next to the first moment, the accelerator pedal angle signals are greater than 0;

the second moment $t_{i,acc,e}$ represents a second moment when the accelerator pedal angle signals are 0, and at a moment previous to the second moment, the accelerator pedal angle signals are greater than 0;

the third moment $t_{i,bra,s}$ represents a third moment when the brake pedal angle signals are 0, and at a moment next to the third moment, the brake pedal angle signals are greater than 0;

the fourth moment $t_{i,bra,e}$ represents a fourth moment when the brake pedal angle signals are 0, and at a moment previous to the fourth moment, the brake pedal angle signals are greater than 0.

7. The method according to claim 2, wherein
there are n parameters to be determined in S51;

S52 specifically comprises:

S521, presetting values of (n−1) parameters of the n parameters to be calibrated, according to an experience;

S522, changing a value of a remaining n-th parameter to be calibrated, and comparing the identification risk values with the risk level values on the risk identification curve corresponding to same moments, wherein when a sum of squares of differences between the identification risk values and the risk level values is minimal, the value of the remaining n-th parameter to be calibrated is determined.

8. The method according to claim 7, wherein
the "synchronized test data" used in S3 comprises accelerator pedal angle signals and brake pedal angle signals of the test vehicle, wherein the accelerator pedal angle signals and the brake pedal angle signals of the test vehicle are collected by the information acquisition device;

S3 specifically comprises:

S31, extracting a distribution of a first moment $t_{i,acc,s}$, a second moment $t_{i,acc,e}$, a third moment $t_{i,bra,s}$ and a fourth moment $t_{i,bra,e}$ of a driver $d_i$ according to the accelerator pedal angle signals and the brake pedal angle signals of the test vehicle;

S32, according to the distribution of the first moment $t_{i,acc,s}$, the second moment $t_{i,acc,e}$, the third moment $t_{i,bra,s}$ and the fourth moment $t_{i,bra,e}$ obtained in S31, combined with $t_{i,acc,s}$, $t_{i,acc,e}$, $t_{i,bra,s}$ and $t_{i,bra,e}$ corresponding to an environment $s_j$ at each of the first moment $t_{i,acc,s}$, the second moment $t_{i,acc,e}$, the third moment $t_{i,bra,s}$ and the fourth moment $t_{i,bra,e}$, using a clustering algorithm, obtaining cluster centers $L_{ij,acc,s}$, $L_{ij,acc,e}$, $L_{ij,bra,s}$, $L_{ij,bra,e}$ of scatter points on $t_{i,acc,s}$, $t_{i,acc,e}$, $t_{i,bra,s}$ and $t_{i,bra,e}$ wherein $L_{ij,acc,s}$ represents a risk level of the first moment $t_{i,acc,s}$, $L_{ij,acc,e}$ represents a risk level of the second moment $t_{i,acc,e}$, $L_{ij,bra,s}$ represents a risk level of the third moment $t_{i,bra,s}$, and $L_{ij,bra,e}$ represents a risk level of the fourth moment $t_{i,bra,e}$;

S33, defining a maximum risk level value $L_{max}$, wherein $L_{max}$ corresponds to TTC=0;

S34, assigning values to $L_{ij,acc,s}$, $L_{ij,acc,e}$, $L_{ij,bra,s}$, $L_{ij,bra,e}$ in a range of [0, Lmax];

wherein i is a serial number of one of the drivers, and i=1 to n;

j is a serial number of one of the plurality of driving scenarios, and j=1 to m.

9. The method according to claim 7, wherein S1 specifically comprises:

mounting a radar and a vision sensor for obtaining target position information and motion information on the test vehicle, mounting a first angle sensor for obtaining accelerator pedal angle signals on the test vehicle, mounting a second angle sensor for obtaining brake pedal angle signals on the test vehicle;

S2 specifically comprises:

fusing data collected by each of the radar and the visual sensor, to obtain the target position information and the motion information, wherein the target position information and the motion information comprise coordinates, speeds, and accelerations.

10. The method according to claim 9, wherein the first moment $t_{i,acc,s}$ represents a first moment when the accelerator pedal angle signals are 0, and at a moment next to the first moment, the accelerator pedal angle signals are greater than 0;

the second moment $t_{i,acc,e}$ represents a second moment when the accelerator pedal angle signals are 0, and at a moment previous to the second moment, the accelerator pedal angle signals are greater than 0;

the third moment $t_{i,bra,s}$ represents a third moment when the brake pedal angle signals are 0, and at a moment next to the third moment, the brake pedal angle signals are greater than 0;

the fourth moment $t_{i,bra,e}$ represents a fourth moment when the brake pedal angle signals are 0, and at a moment previous to the fourth moment, the brake pedal angle signals are greater than 0.

11. The method according to claim 2, wherein the "synchronized test data" used in S3 comprises accelerator pedal angle signals and brake pedal angle signals of the test vehicle, wherein the accelerator pedal angle signals and the brake pedal angle signals of the test vehicle are collected by the information acquisition device;

S3 specifically comprises:

S31, extracting a distribution of a first moment $t_{i,acc,s}$, a second moment $t_{i,acc,e}$, a third moment $t_{i,bra,s}$ and a fourth moment $t_{i,bra,e}$ of a driver $d_i$ according to the accelerator pedal angle signals and the brake pedal angle signals of the test vehicle;

S32, according to the distribution of the first moment $t_{i,acc,s}$, the second moment $t_{i,acc,e}$, the third moment $t_{i,bra,s}$ and the fourth moment $t_{i,bra,e}$ obtained in S31, combined with to $t_{i,acc,s}$, $t_{i,acc,e}$, $t_{i,bra,s}$ and $t_{i,bra,e}$ corresponding to an environment $s_j$ at each of the first moment $t_{i,acc,s}$, the second moment $t_{i,acc,e}$, the third moment $t_{i,bra,s}$ and the fourth moment $t_{i,bra,e}$, using a clustering algorithm, obtaining cluster centers $L_{ij,acc,s}$, $L_{ij,acc,e}$, $L_{ij,bra,s}$, $L_{ij,bra,e}$ of scatter points on $t_{i,acc,s}$, $t_{i,acc,e}$, $t_{i,bra,s}$ and $t_{i,bra,e}$, wherein $L_{ij,acc,s}$ represents a risk level of the first moment $t_{i,acc,s}$, $L_{ij,acc,e}$ represents a risk level of the second moment $t_{i,acc,e}$, $L_{ij,bra,s}$ represents a risk level of the third moment $t_{i,bra,s}$, and $L_{ij,bra,e}$ represents a risk level of the fourth moment $t_{i,bra,e}$;

S33, defining a maximum risk level value $L_{max}$, wherein $L_{max}$ corresponds to TTC=0;

S34, assigning values to $L_{ij,acc,s}$, $L_{ij,acc,e}$, $L_{ij,bra,s}$, $L_{ij,bra,e}$ in a range of [0, Lmax];

wherein i is a serial number of one of the drivers, and i=1 to n;

j is a serial number of one of the plurality of driving scenarios, and j=1 to m.

12. The method according to claim 2, wherein S1 specifically comprises:

mounting a radar and a vision sensor for obtaining target position information and motion information on the test vehicle, mounting a first angle sensor for obtaining accelerator pedal angle signals on the test vehicle, mounting a second angle sensor for obtaining brake pedal angle signals on the test vehicle;

S2 specifically comprises:

fusing data collected by each of the radar and the visual sensor, to obtain the target position information and the motion information, wherein the target position information and the motion information comprise coordinates, speeds, and accelerations.

13. The method according to claim 12, wherein the first moment $t_{i,acc,s}$ represents a first moment when the accelerator pedal angle signals are 0, and at a moment next to the first moment, the accelerator pedal angle signals are greater than 0;

the second moment $t_{i,acc,e}$ represents a second moment when the accelerator pedal angle signals are 0, and at a moment previous to the second moment, the accelerator pedal angle signals are greater than 0;

the third moment $t_{i,bra,s}$ represents a third moment when the brake pedal angle signals are 0, and at a moment next to the third moment, the brake pedal angle signals are greater than 0;

the fourth moment $t_{i,bra,e}$ represents a fourth moment when the brake pedal angle signals are 0, and at a moment previous to the fourth moment, the brake pedal angle signals are greater than 0.

14. The method according to claim 1, wherein the "synchronized test data" used in S3 comprises accelerator pedal angle signals and brake pedal angle signals of the test vehicle, wherein the accelerator pedal angle signals and the brake pedal angle signals of the test vehicle are collected by the information acquisition device;

S3 specifically comprises:

S31, extracting a distribution of a first moment $t_{i,acc,s}$, a second moment $t_{i,acc,e}$, a third moment $t_{i,bra,s}$ and a fourth moment $t_{i,bra,e}$ of a driver $d_i$ according to the accelerator pedal angle signals and the brake pedal angle signals of the test vehicle;

S32, according to the distribution of the first moment $t_{i,acc,s}$, the second moment $t_{i,acc,e}$, the third moment $t_{i,bra,s}$ and the fourth moment $t_{i,bra,e}$ obtained in S31, combined with $t_{i,acc,s}$, $t_{i,acc,e}$, $t_{i,bra,s}$ and $t_{i,bra,e}$ corresponding to an environment $s_j$ at each of the first moment $t_{i,acc,s}$, the second moment $t_{i,acc,e}$, the third moment $t_{i,bra,s}$ and the fourth moment $t_{i,bra,e}$, using a clustering algorithm, obtaining cluster centers $L_{ij,acc,s}$, $L_{ij,acc,e}$, $L_{ij,bra,s}$, $L_{ij,bra,e}$ of scatter points on $t_{i,acc,s}$, $t_{i,acc,e}$, $t_{i,bra,s}$ and $t_{i,bra,e}$, wherein $L_{ij,acc,s}$ represents a risk level of the first moment $t_{i,acc,s}$, $L_{ij,acc,e}$ represents a risk level of the second moment $t_{i,acc,e}$, $L_{ij,bra,s}$ represents a risk level of the third moment $t_{i,bra,s}$, and $L_{ij,bra,e}$ represents a risk level of the fourth moment $t_{i,bra,e}$;

S33, defining a maximum risk level value $L_{max}$, wherein $L_{max}$ corresponds to TTC=0;

S34, assigning values to $L_{ij,acc,s}$, $L_{ij,acc,e}$, $L_{ij,bra,s}$, $L_{ij,bra,e}$ in a range of [0, Lmax];

wherein i is a serial number of one of the drivers, and i=1 to n;

j is a serial number of one of the plurality of driving scenarios, and j=1 to m.

15. The method according to claim 1,
wherein S1 specifically comprises:
mounting a radar and a vision sensor for obtaining target position information and motion information on the test vehicle,
mounting a first angle sensor for obtaining accelerator pedal angle signals on the test vehicle,
mounting a second angle sensor for obtaining brake pedal angle signals on the test vehicle;
S2 specifically comprises:
fusing data collected by each of the radar and the visual sensor, to obtain the target position information and the motion information, wherein the target position information and the motion information comprise coordinates, speeds, and accelerations.

16. The method according to claim 15,
wherein the first moment $t_{i,acc,s}$ represents a first moment when the accelerator pedal angle signals are 0, and at a moment next to the first moment, the accelerator pedal angle signals are greater than 0;
the second moment $t_{i,acc,e}$ represents a second moment when the accelerator pedal angle signals are 0, and at a moment previous to the second moment, the accelerator pedal angle signals are greater than 0;
the third moment $t_{i,bra,s}$ represents a third moment when the brake pedal angle signals are 0, and at a moment next to the third moment, the brake pedal angle signals are greater than 0;
the fourth moment $t_{i,bra,e}$ represents a fourth moment when the brake pedal angle signals are 0, and at a moment previous to the fourth moment, the brake pedal angle signals are greater than 0.

17. A system for calibrating a driving risk identification model, comprising:
an information acquisition device, wherein the information acquisition device is mounted on a test vehicle to form a vehicle platform, and the information acquisition device is configured for collecting synchronized test data related to the test vehicle and synchronized test data related to a plurality of driving scenarios, wherein the synchronized test data related to the test vehicle comprise goal position information and motion information, accelerator pedal angle signals and brake pedal angle signals; the synchronized test data related to the plurality of driving scenarios comprise environmental types, traffic participants, traffic signs, and road signs;

a moment extraction device, wherein the moment extraction device is configured for extracting, according to the synchronized test data, first moments when drivers start to press an accelerator pedal in the plurality of driving scenarios, second moments when the drivers start to release the accelerator pedal in the plurality of driving scenarios, third moments when the drivers start to press a brake pedal in the plurality of driving scenarios, and fourth moments when the drivers start to release the brake pedal in the plurality of driving scenarios;

a risk level definition device, wherein the risk level definition device is configured for defining risk level values respectively corresponding to the first moments, the second moments, the third moments, and the fourth moments;

a risk identification curve obtaining device, wherein the risk identification curve obtaining device is configured for obtaining a risk identification curve of the drivers in the plurality of scenarios according to the risk level values, and the risk identification curve represents a judgment of a risk level over time of the drivers; and a calibration device, wherein the calibration device is configured for calibrating the driving risk identification model by using the risk identification curve.

18. The system according to claim 17, wherein the calibration device comprises:

a driving risk identification calculation unit, wherein the driving risk identification calculation unit is configured for calculating identification risk values corresponding to the first moments, the second moments, the third moments, and the fourth moments by using the driving risk identification model, wherein the identification risk values comprise at least one parameter to be calibrated; and a parameter calibration unit, wherein the parameter calibration unit is configured for adjusting the at least one parameter to be calibrated, wherein a curve of the identification risk values obtained by the driving risk identification model is close to the risk identification curve.

\* \* \* \* \*